(12) United States Patent
Niko

(10) Patent No.: US 7,031,516 B2
(45) Date of Patent: Apr. 18, 2006

(54) EDGE ACHROMATIZATION CIRCUIT AND METHOD

(75) Inventor: Hidemitsu Niko, Tokyo (JP)

(73) Assignee: NEC Corporation, Tokyo (JP)

(*) Notice: Subject to any disclaimer, the term of this patent is extended or adjusted under 35 U.S.C. 154(b) by 1018 days.

(21) Appl. No.: 10/000,951

(22) Filed: Dec. 4, 2001

(65) Prior Publication Data

US 2002/0067434 A1 Jun. 6, 2002

(30) Foreign Application Priority Data

Dec. 5, 2000 (JP) ............................. 2000-369887

(51) Int. Cl.
    *G06K 9/00* (2006.01)

(52) U.S. Cl. ...................... 382/167; 358/520

(58) Field of Classification Search ..................... None
    See application file for complete search history.

(56) References Cited

U.S. PATENT DOCUMENTS 3,627,911 A * 12/1971 Kubota et al. ............ 348/228.1
4,335,397 A * 6/1982 Tamura .................. 348/207.99
6,621,519 B1 * 9/2003 Nakayama et al. ....... 348/223.1

FOREIGN PATENT DOCUMENTS

| EP | 0 543 351 | 5/1993 |
|----|-----------|--------|
| EP | 1 128 660 | 8/2001 |
| JP | 63-70773  | 5/1988 |
| JP | 2000-165813 | 6/2000 |

* cited by examiner

*Primary Examiner*—Jingge Wu
*Assistant Examiner*—Damon Conover
(74) *Attorney, Agent, or Firm*—Foley & Lardner LLP (57) ABSTRACT

An edge achromatization circuit and method is disclosed wherein, in digital camera signal processing, a signal having a linear characteristic before γ correction is performed to suppress a color component of an edge portion while keeping a luminance. The edge achromatization circuit includes a luminance signal operation matrix circuit for converting R, G, B signals before γ correction is performed therefor into a luminance signal, an edge detection circuit for extracting an edge signal from the luminance signal, an absolute value operation circuit for converting the edge signal into an absolute value, a multiplier for controlling the gain of the absolute value, subtractors for obtaining color difference signals from the R, G, B signals and the luminance signal, multipliers for multiplying the color difference signals and an output coefficient, and subtractors for arithmetically operating results of the multiplication and the R, G, B signals to obtain R', G', B' color signals. The edge achromatization circuit can perform achromatization of an edge of an image without providing a quick variation to the signal.

14 Claims, 6 Drawing Sheets

PRIOR ART

EDGE ACHROMATIZATION CIRCUIT AND METHOD

BACKGROUND OF THE INVENTION

1. Field of the Invention

This invention relates to an edge achromatization circuit and method for digital camera signal processing, and more particularly to an edge achromatization circuit and method by which a false color at an edge of an image in digital camera signal processing in which a single plate image pickup element is used is removed.

2. Description of the Related Art

Conventionally, in a digital camera which uses an image pickup element of a single plate, a false color which appears at an edge of an image becomes a problem which cannot be ignored as the picture quality of a camera becomes higher. Thus, it is requested to suppress a false color to obtain a high picture quality.

In order to satisfy the request, it is proposed to suppress the amplitude of a chroma signal at an edge portion of a luminance signal to suppress a false color at an edge of an image as disclosed, for example, in Japanese Utility Model Laid-Open No. 070773/1988 entitled "Achromatization Edge Processing Circuit".

Figure 6:
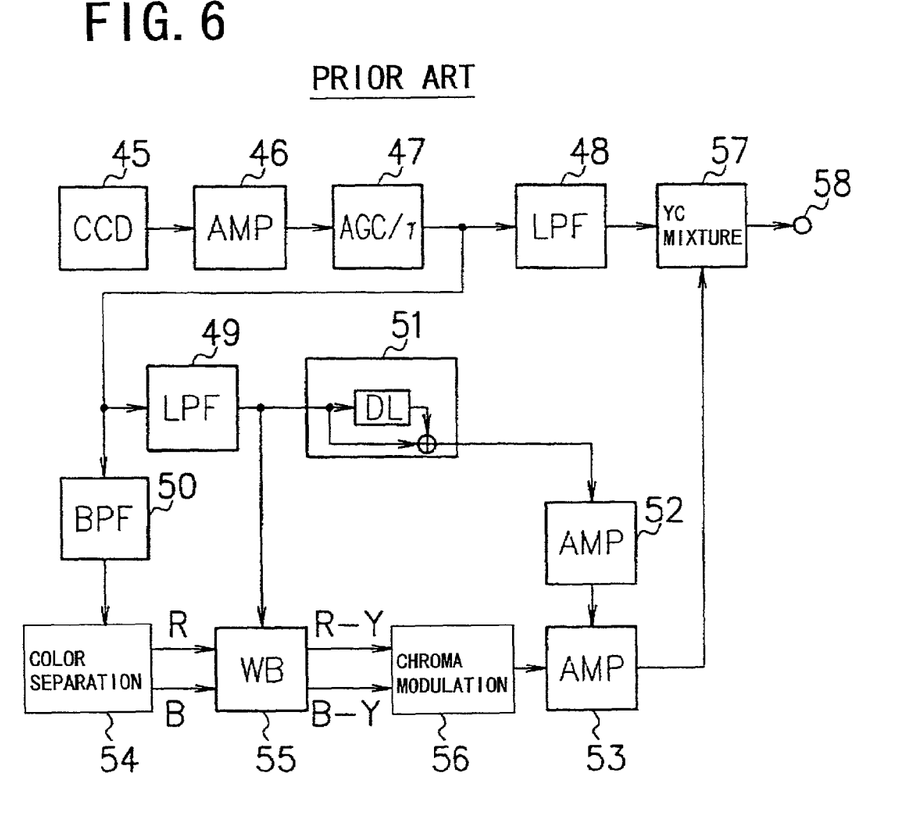
FIG. 6 is a block diagram showing a general configuration of a conventional edge achromatization circuit.

FIG. 6 shows a general configuration of the achromatization edge processing circuit disclosed in the document specified above. Referring to FIG. 6, the achromatization edge processing circuit shown includes an image sensor (CCD) 45, amplifiers (AMP) 46, 52 and 53, an automatic gain control and $\gamma$ conversion circuit (AGC/$\gamma$) 47, low-pass filters (LPF) 48 and 49, a band-pass filter (BPF) 50, an edge extraction circuit 51, a color separation circuit 54, a white balance (WB) circuit 55, a chroma modulation circuit 56, a YC mixture circuit 57, and an output terminal 58.

An output of the image sensor 45 is subject to gain control and $\gamma$ correction by the amplifier 46 and the automatic gain control and $\gamma$ conversion circuit 47. An output of the automatic gain control and $\gamma$ conversion circuit 47 is band-limited by the low-pass filter 48 so that it is converted into a luminance signal YH which includes many high frequency components, and is band-limited by the low-pass filter 49 so that it is converted into a luminance signal YL which does not include many high frequency components. Further, the output of the automatic gain control and $\gamma$ conversion circuit 47 is band-limited by the band-pass filter 50. An output of the band-pass filter 50 is converted into color signals R and B by the color separation circuit 54.

The color signals R and B are subject to color balancing and arithmetic operation with the luminance signal YL, which does not include many high frequency components, by the white balance circuit 55 so that they are converted into color difference signals R-Y and B-Y, respectively. The color difference signals R-Y and B-Y are converted into a chroma signal of a video signal by the chroma modulation circuit 56 and then inputted to the amplifier 53. Meanwhile, the luminance signal YH which does not include many high frequency components is converted into an edge signal by the edge extraction circuit 51, and the edge signal is shaped by the amplifier 52 and then inputted to the amplifier 53. The amplifier 53 performs gain control of the chroma signal so that, as the magnitude of the edge signal decreases, the amplitude of the chroma signal may increase, and as the magnitude of the edge signal increases, the amplitude of the chroma signal may decrease.

In this manner, the achromatization edge processing circuit disclosed in the above-specified document extracts an edge component from a luminance component which includes a comparatively small amount of high frequency components and performs gain control of a chroma signal with the extracted signal to suppress a false color.

In the achromatization edge processing circuit disclosed in the document mention above, however, since gain control for a chroma signal is performed with an edge signal of a luminance, processing is performed for a signal having a non-linear characteristic to which $\gamma$ correction has been performed. Therefore, the achromatization edge processing circuit has a problem that, when the signal is regenerated finally as an image, the image is suppressed unnaturally.

Further, where a color difference signal is used for interfacing, a chroma signal must be decoded back into color difference signals. If the chroma signal is that of the NTSC system, then since the color difference signals are subject to band-limitation by the low-pass filter and the band-pass filter, the achromatization edge processing circuit has another problem that a signal band for a color disappears and the resolution is deteriorated.

Further, since the characteristic that the gain is lowered when the level of the edge signal is high is reverse to that of multiplication, the achromatization edge processing circuit has a further problem that, where digital signal processing is applied, a large circuit scale is required.

SUMMARY OF THE INVENTION

It is an object of the present invention to provide an edge achromatization circuit and method by which a color of an output image can be eliminated while keeping a luminance without making the output image unnatural and without increasing the circuit scale.

In order to attain the object described above, according to the present invention, a circuit for multiplexing signals is adopted making use of circuits which are usually used for digital camera signal processing, and a signal having a linear characteristic before $\gamma$ correction is performed therefor is processed.

In particular, according to an aspect of the present invention, there is provided an edge achromatization circuit, comprising luminance signal conversion means for converting first color signals inputted from an input terminal group before $\gamma$ correction processing into a luminance signal, first subtraction means for arithmetically operating the luminance signal and the first color signals to obtain color difference signals, edge detection means for detecting an edge signal from the luminance signal, absolute value operation means for converting the edge signal into an absolute value, first multiplication means for multiplying the absolute from the absolute value operation means and a first coefficient signal inputted thereto from the input terminal group to control the gain of the value, level limit means for obtaining a second output coefficient from the value of the controlled gain and a limit level setting signal inputted thereto from the input terminal group, second multiplication means for multiplying the second output coefficient and the color difference signals outputted from the first subtraction means, and second subtraction means for arithmetically operating results of the multiplication by the second multiplication means and the first color signals to obtain second color signals to be outputted from the edge achromatization circuit.

According to another aspect of the present invention, there is provided an edge achromatization circuit, comprising switching means for switchably outputting first color signals inputted from an input terminal group before $\gamma$ correction processing and second color signals, luminance signal conversion means for converting the first color signals or the second color signals switchably inputted thereto from the switching means into a luminance signal, first subtraction means for arithmetically operating the luminance signal and the first color signals or the second color signals switchably inputted thereto from the switching means to obtain color difference signals, first sample hold means for extracting the color difference signals obtained by the first subtraction means, second sample hold means for extracting the luminance signal outputted from the luminance signal conversion means, edge detection means for detecting an edge signal from the luminance signal extracted by the second sample hold means, absolute value operation means for converting the edge signal into an absolute value, first multiplication means for multiplying the absolute value from the absolute value operation means and a first coefficient signal inputted thereto from the input terminal group to control the gain of the value, level limit means for obtaining a second output coefficient from the value of the control gain and a limit level setting signal inputted thereto from the input terminal group, second multiplication means for multiplying the second output coefficient and the color difference signals extracted by the first sample hold means, second subtraction means for arithmetically operating results of the multiplication by the second multiplication means and the first color signals or the second color signals switchably inputted from the switching means to obtain third color signals, third sample hold means for extracting color difference signals from the outputs of the first sample hold means, and fourth sample hold means for extracting a luminance signal component from the output of the second sample hold means.

In both of the edge achromatization circuits, the edge detection means may include delay means for delaying the luminance signal from the luminance signal conversion means by a unit time and outputting the delayed luminance signal, and third subtraction means for arithmetically operating the delayed luminance signal from the delay means and the luminance signal to produce an edge detection signal and outputting the edge detection signal.

In both of the edge achromatization circuits, the input terminal group include a first terminal to which an R signal is inputted, a second terminal to which a B signal is inputted, a third terminal to which a G signal is inputted, a fourth terminal to which the first coefficient signal is inputted, and a fifth terminal to which the limit level setting signal is inputted.

According to a further aspect of the present invention, there is provided an edge achromatization circuit, comprising first to fifth input terminals, luminance signal operation means, first to sixth subtraction means, first to fourth multiplication means, edge detection means, absolute value operation means, level limit means, and first to third output terminals, the first to third input terminals being connected to an R signal input, a G signal input and a B signal input of the luminance signal operation means, minuend inputs of the first to third subtraction means and minuend inputs of the fourth to sixth subtraction means, respectively, an output of the luminance signal operation means being connected to the minuend inputs of the first to third subtraction means and an input of the edge detection means, outputs of the first to third subtraction means being inputted to first inputs of the first to third multiplication means, respectively, an output of the edge detection means being connected to an input of the absolute value operation means, an output of the absolute value operation means being connected to a first input of the fourth multiplication means, the fourth input terminal being connected to a second input of the fourth multiplication means, an output of the fourth multiplication means being connected to an input of the level limit means, the fifth input terminal being connected to a limit level input of the level limit means, an output of the level limit means being connected to second inputs of the first to third multiplication means, outputs of the first to third multiplication means being connected to subtrahend inputs of the fourth to sixth subtraction means, respectively, outputs of the fourth to sixth subtraction means being connected to the first to third terminals, respectively.

According to a still further aspect of the present invention, there is provided an edge achromatization circuit, comprising first to fifth input terminals, luminance signal operation means, first to sixth subtraction means, first to fourth multiplication means, edge detection means, absolute value operation means, level limit means, first to third 2-input switch means, first to eighth sample hold means, and first to seventh output terminals, the first to third 2-input switch means having first input terminals to which first color signals from the first to third input terminals are inputted and second input terminals to which second color signals from the fourth to sixth subtraction means are inputted, respectively, outputs of the first to third 2-input switch means alternately outputting the first color signals and the second color signals to the luminance signal conversion means and the first to third subtraction means, respectively, the luminance signal conversion means alternately outputting a first luminance signal obtained by conversion from the first color signals and a second luminance signal obtained by conversion from the second color signals to the first to third subtraction means and the fourth sample hold means, the first to third subtraction means arithmetically operating the first color signals and the first luminance signal or the second color signals and the second luminance signal to produce first color difference signals or second color difference signals to be outputted to the first to third sample hold means, the fourth sample hold means outputting the luminance signal outputted from the luminance signal conversion means to the edge detection means and the eighth sample hold means, the edge detection means detecting an edge signal from the luminance signal and outputting the edge signal to the absolute value operation means, the absolute value operation means converting the edge signal in to an absolute value and outputting the absolute value to the first multiplication means, the first multiplication means outputting a value obtained by arithmetic operation of the absolute value from the absolute value operation means and a first output coefficient inputted from the fourth input terminal to the level limit means, the level limit means calculating a second output coefficient from the value from the first multiplication means and a level limit setting signal inputted thereto from the fifth input terminal and outputting the second output coefficient to the second to fourth multiplication means, the second to fourth multiplication means arithmetically operating the second output coefficient and the first color difference signals or the second color difference signals outputted from the first to third sample hold means and outputting results of the arithmetic operation to the fourth to sixth subtraction means, respectively, the fourth to sixth subtraction means arithmetically operating the outputs of the second to fourth multiplication means and the first color signals or the second color signals to produce third color signals and outputting the third color signals to the first to third output terminals, respectively, the fifth to seventh sample hold means extracting color difference signals from the outputs of the second to fourth sample hold means and outputting the color difference signals to the fifth to seventh output terminals, respectively, the eighth sample hold means extracting a luminance signal component from the output of the fourth sample hold means and outputting the luminance signal component to the fourth output terminal.

Both of the edge achromatization circuits may be configured such that the edge detection means includes an input terminal, unit time delay means, subtraction means, and an output terminal, and the input terminal is connected to an input of the unit time delay means and one of inputs of the subtraction means while an output of the unit time delay means is connected to the other input of the subtraction means and an output of the subtraction means is connected to the output terminal.

According to a yet further aspect of the present invention, there is provided an edge achromatization method for an edge achromatization apparatus, comprising a luminance signal conversion step of converting RGB signals inputted from an input terminal group of the edge achromatization apparatus before γ correction processing into a luminance signal, a first subtraction step of arithmetically operating the luminance signal and the RGB signals to obtain color difference signals, an edge signal detection step of detecting an edge signal from the luminance signal, an absolute value operation step of converting the edge signal into an absolute value, a first multiplication step of multiplying the absolute value and a first coefficient signal inputted from the input terminal group to control the gain of the value, a level limit step of obtaining a second output coefficient from the value of the controlled gain and a limit level setting signal inputted from the input terminal group, a second multiplication step of multiplying the second output coefficient and the color difference signals obtained by the first subtraction step, and a second subtraction step of arithmetically operating results of the multiplication by the second multiplication step and the RGB signals to obtain second color signals to be outputted from the edge achromatization apparatus.

According to a yet further aspect of the present invention, there is provided an edge achromatization method for an edge achromatization apparatus, comprising a switching step of switchably outputting first color signals inputted from an input terminal group of the edge achromatization apparatus before γ correction processing and second color signals, a luminance signal conversion step of converting the first color signals or the second color signals switchably inputted by the switching step into a luminance signal, a first subtraction step of arithmetically operating the luminance signal and the first color signals or the second color signals switchably inputted by the switching step to obtain color difference signals, a first sample hold step of extracting the color difference signals obtained by the first subtraction step, a second sample hold step of extracting the luminance signal outputted by the luminance signal conversion step, an edge detection step of detecting an edge signal from the luminance signal extracted by the first sample hold step, an absolute value operation step of converting the edge signal into an absolute value, a first multiplication step of multiplying the absolute value and a first coefficient signal inputted from the input terminal group to adjust the gain of the value, a level limit step of obtaining a second output coefficient from the value of the controlled gain and a limit level setting signal inputted from the input terminal group, a second multiplication step of multiplying the second output coefficient and the color difference signals extracted by the first sample hold step, a second subtraction step of arithmetically operating results of the multiplication by the second multiplication step and the first color signals or the second color signals switchably inputted by the switching step to obtain third color signals, a third sample hold step of extracting color difference signals from the outputs of the first sample hold step, and a fourth sample hold step of extracting a luminance signal component from the output of the second sample hold step.

In both of the edge achromatization methods, the edge detection step may include a delay step of delaying the luminance signal obtained by the luminance signal conversion step by a unit time and outputting the delayed luminance signal, and a third subtraction step of arithmetically operating the luminance signal delayed by the delay step and the luminance signal to produce an edge detection signal and outputting the edge detection signal.

In the edge achromatization circuits according to the present invention, first color signals or R, G, B signals before they are subject to γ correction processing are converted into a luminance signal, and an edge signal is detected from the luminance signal. The edge signal converted into an absolute value, and the gain of the absolute value is controlled. Further, the level of the edge signal is limited to determine an output coefficient α, and the calculated output coefficient α and color difference signals are arithmetically operated. Then, results of the arithmetic operation and the inputted original R, G, B signals are arithmetically operated.

With the edge achromatization circuits, if the edge component of the luminance signal increases and the output coefficient α approaches 1, then all of the outputs of the circuit output the luminance signal, but if the luminance signal decreases and the output coefficient α approaches 0, then the R, G and B outputs of the circuit are outputted as they are. Accordingly, the edge achromatization circuits are advantageous in that, as the edge of the luminance signal increases, then the differences among the R, G, B and luminance signals decrease and therefore the regenerated color becomes light and a false color is suppressed.

Further, since achromatization of an edge portion is performed without providing a quick variation to a signal, the image looks natural.

Further, since achromatization of an edge portion is performed and no naturalness is provided to the image without using a divider or an inverse number arithmetic operation unit for the circuit configuration, the circuit scale can be reduced.

Furthermore, since a circuit necessary for digital camera processing is used as a component, a burden in regard to the scale is not imposed on the system through the re-utilization of the circuit.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

First Embodiment

Figure 1:
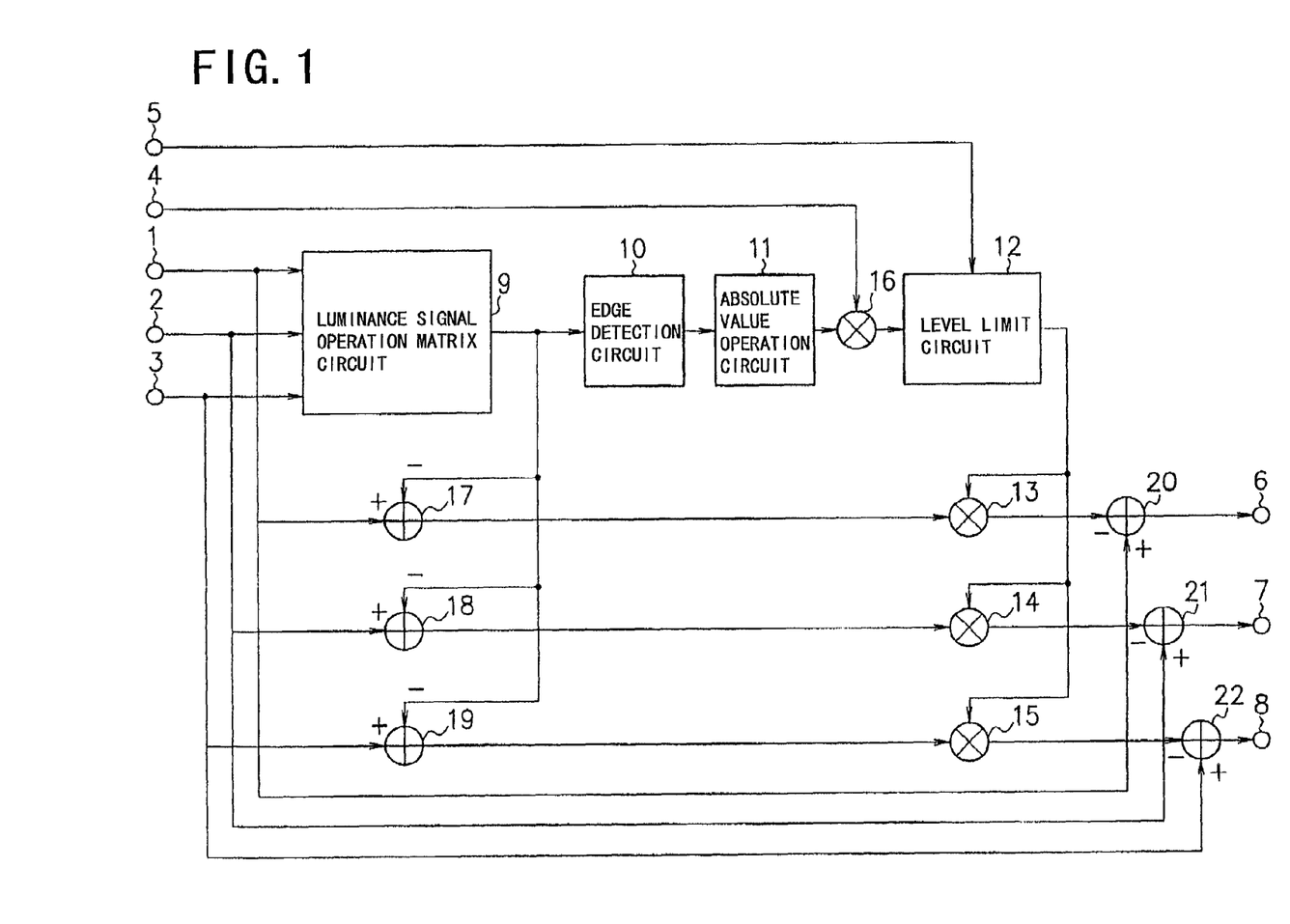
FIG. 1 is a block diagram showing a general configuration of an edge achromatization circuit to which the present invention is applied.

Referring to FIG. 1, there is shown a general configuration of an edge achromatization circuit to which the present invention is applied. The edge achromatization circuit shown includes input terminals 1 to 5, output terminals 6 to 8, a luminance signal operation matrix circuit 9, an edge detection circuit 10, an absolute value operation circuit 11, a level limit circuit 12, multiplication circuits 13 to 16, and subtraction circuits 17 to 22.

Color signals R, G, B inputted from the input terminals 1 to 3, respectively, are supplied to the luminance signal operation matrix circuit 9, by which they are converted into a luminance signal Y. The output of the luminance signal operation matrix circuit 9 is processed by the subtraction circuits 17 to 19, by which they are converted into color difference signals, that is, R-Y signal, G-Y signal and B-Y signal, respectively. Meanwhile, the luminance signal Y determined by the luminance signal operation matrix circuit 9 is converted into an edge signal ΔY by the edge detection circuit 10.

The edge signal ΔY is converted into an absolute value |ΔY| by the absolute value operation circuit 11. The absolute value |ΔY| is multiplied by a coefficient signal β inputted from the input terminal 4 by the multiplication circuit 16 to make a signal |β|. The signal |β| is limited in level with an limit level setting signal ε inputted from the input terminal 5 by the level limit circuit 12 so that an output coefficient α is obtained.

The output coefficient α is arithmetically operated with the color difference signals R-Y, G-Y, B-Y so that it is converted into output signals α(R-Y), α(G-y), α(B-Y), respectively. The output signals α(R-Y), α(G-y), α(B-Y) obtained by the conversion are arithmetically operated with the color signals R, G, B inputted from the input terminals 1 to 3 by the subtraction circuits 20 to 22 so that they are converted into signals R-α(R-Y), G-α(G-y), B-α(B-Y). The signals R-α(R-Y), G-α(G-y), B-α(B-Y) are supplied to the output terminals 6 to 8, respectively, and outputted as color signals.

Figure 2:
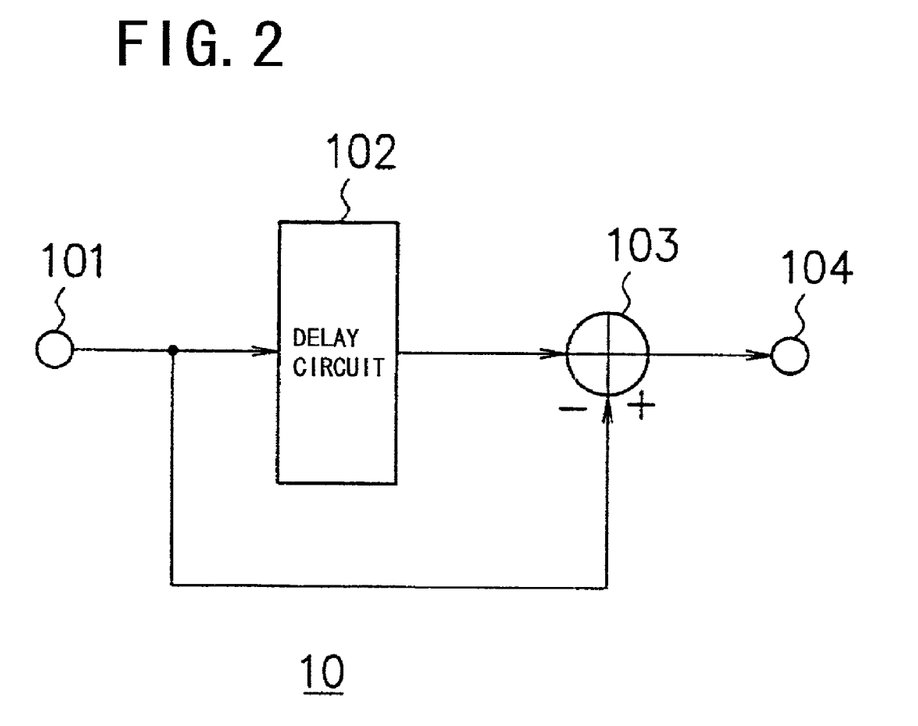
FIG. 2 is a block diagram showing a general configuration of an edge detection circuit shown in FIG. 1.

FIG. 2 shows a general configuration of the edge detection circuit of the edge achromatization circuit of FIG. 1. Referring to FIG. 2, the edge detection circuit 10 shown includes an input terminal 101, a delay circuit 102, a subtraction circuit 103, and an output terminal 104.

A signal inputted from the input terminal 101 is delayed by a unit time by the delay circuit 102. An output signal of the delay circuit 102 and the input signal from the input terminal 101 are arithmetically operated by the subtraction circuit 103, and a resulting signal is outputted from the output terminal 104. The luminance signal Y inputted to the input terminal 101 is subject to such processing as described above executed by the edge detection circuit 10, and an edge signal (ΔY) is outputted to the absolute value operation circuit 11 in the following stage.

It is to be noted that, since the luminance signal operation matrix circuit 9, absolute value operation circuit 11, level limit circuit 12 and so forth shown in FIG. 1 are well known to those skilled in the art and the configuration of them does not directly relate to the present invention, the detailed configuration of them is omitted herein.

Figure 3:
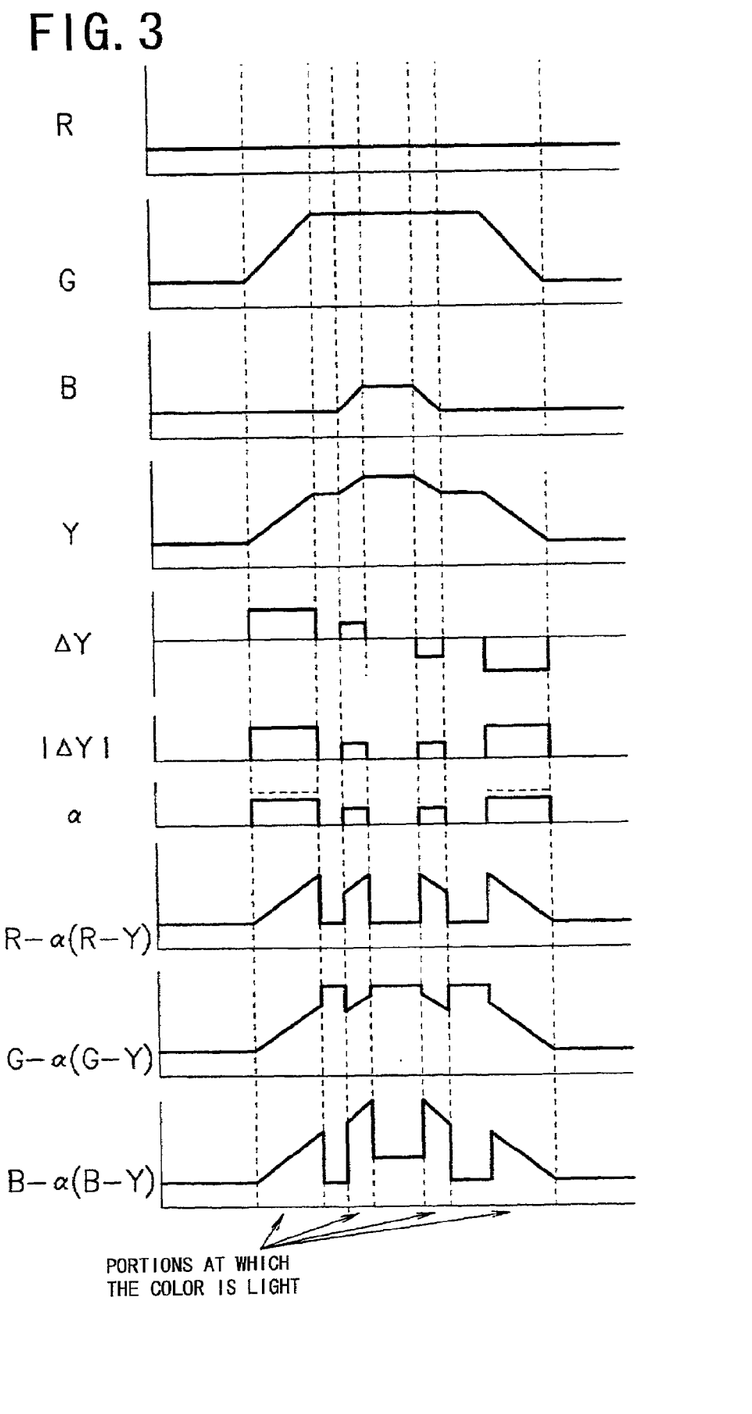
FIG. 3 is a timing chart illustrating an example of operation of the edge achromatization circuit of FIG. 1.

FIG. 3 is a timing chart illustrating an example of operation of the edge achromatization circuit according to the first embodiment of the present invention. Referring to FIG. 3, the color signals R, G, B are inputted from the input terminals 1 to 3, respectively. The input signals are converted into the luminance signal Y by the luminance signal operation matrix circuit 9, and a primary difference is taken by the edge detection circuit 10 to form an edge signal ΔY. Then, if the edge signal ΔY has a negative value, then it is changed to a positive value by the absolute value operation circuit 11, and consequently, it is outputted as an absolute value |ΔY|. Then, the absolute value |ΔY| is multiplied by the coefficient signal β by the multiplication circuit 16, and a value obtained by the multiplication is subject to level adjustment in accordance with the limit level setting signal ε by the level limit circuit 12 to obtain the output coefficient α.

The subtraction circuits 17 to 19 arithmetically operate the R, G, B signals inputted from the input terminals 1 to 3 and the luminance signal Y obtained by the conversion by the luminance signal operation matrix circuit 9 and output the color difference signals R-Y, G-Y, B-Y. The multiplication circuits 13 to 15 arithmetically operate the output coefficient α of the output of the level limit circuit 12 and the outputs R-Y, G-Y, B-Y of the subtraction circuits 17 to 19 to obtain signals α(R-Y), α(G-y), α(B-Y), respectively. The subtraction circuits 20 to 22 arithmetically operate the outputs of R-Y, G-Y, B-Y of the subtraction circuits 17 to 19 and the R, G, B signals inputted from the input terminals 1 to 3 to obtain values R-α(R-Y), G-α(G-y), B-α(B-Y), respectively. The values are outputted from the output terminals 6 to 8.

The output coefficient α outputted from the level limit circuit 12 exhibits a continuous variation in accordance with the magnitude of the edge signal, and if the limit level is set to 1 (ε=1), then the output coefficient α assumes a value ranging from 0 to 1. When α is 0, the inputs to the edge achromatization circuit are outputted as they are, but when α is 1, all of the input R, G, B signals become the luminance signal Y and represent an achromatic color.

Since an image at an edge portion of the luminance signal is continuously converted into an achromatic color in this manner, the resulting image looks natural. Further, the edge achromatization circuit exhibits an effect also that the circuit scale does not increase because it does not use a divider, an inverse number arithmetic operation circuit or a like circuit element.

Second Embodiment

Figure 4:
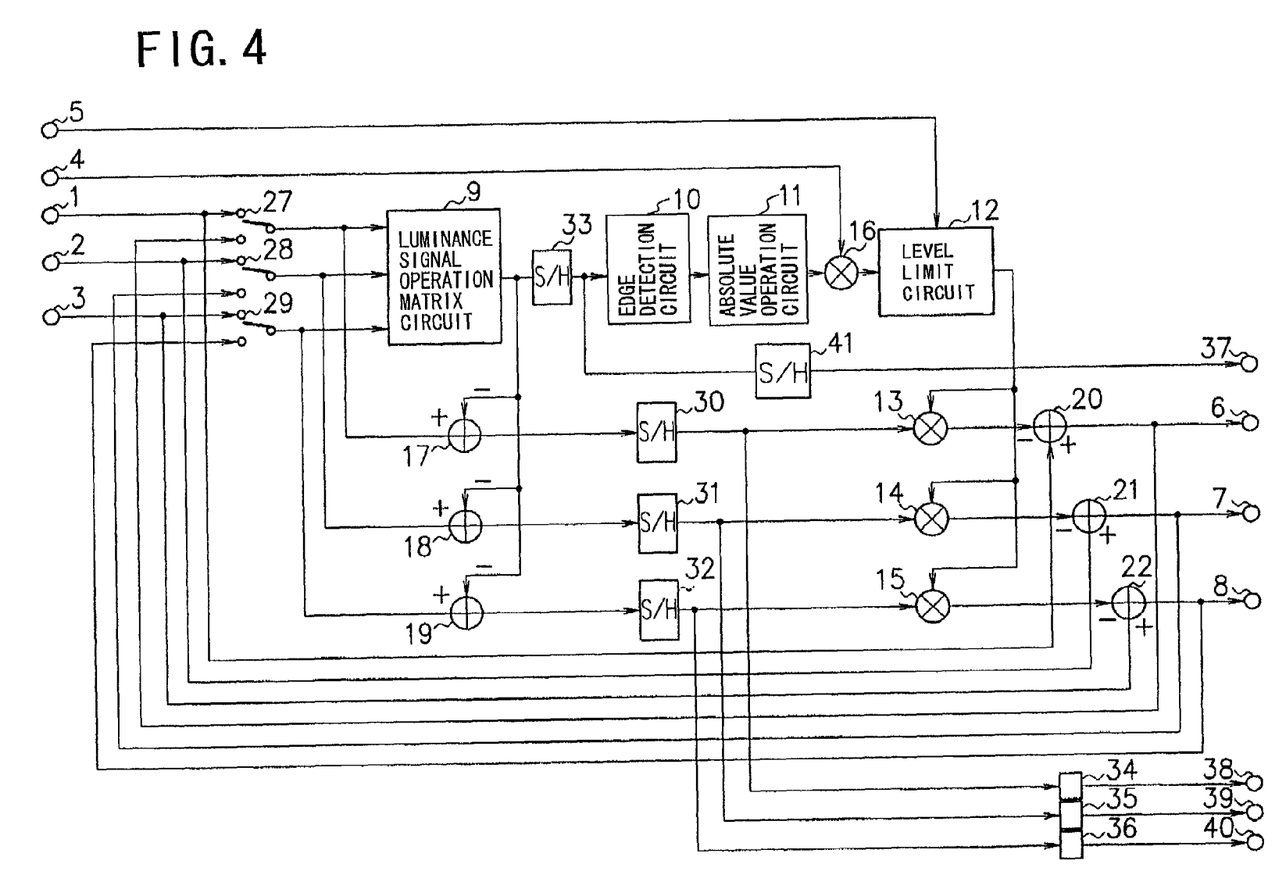
FIG. 4 is a block diagram showing a general configuration of another edge achromatization circuit to which the present invention is applied.

FIG. 4 shows a general configuration of another edge achromatization circuit to which the present invention is applied. The edge achromatization circuit according to the second embodiment of the present invention has a basic configuration similar to that of the first embodiment described above, but is different in that the luminance signal operation matrix circuit 9 and the subtraction circuits 17 to 19 are re-utilized to change the outputs from R, G, B signals to Y, R-Y, B-Y and G-Y signals.

Referring to FIG. 4, the edge achromatization circuit according to the second embodiment of the present invention includes input terminals 1 to 5, output terminals 6 to 8 and 37 to 40, a luminance signal operation matrix circuit 9, an edge detection circuit 10, an absolute value operation circuit 11, a level limit circuit 12, multiplication circuits 13 to 16, subtraction circuits 17 to 22, 2-input switch circuits 27 to 29, and sample hold (S/H) circuits 30 to 36 and 41.

Color signals R, G, B from the input terminals 1 to 3 are inputted to first inputs of the 2-input switch circuits 27 to 29, respectively, and color signals R, G, B' which are outputs of the subtraction circuits 20 to 22 are inputted to the other or second inputs of the 2-input switch circuits 27 to 29, respectively. The input signals R, G, B or R', G', B' are outputted alternately as signals Rs, Gs and Bs from the 2-input switch circuits 27 to 29, respectively.

The outputs Rs, Gs and Bs are connected to R, G, B inputs of the luminance signal operation matrix circuit 9 and first inputs of the subtraction circuits 17 to 19, respectively. Outputs of the subtraction circuits 17 to 19 are connected to the sample hold circuits 30 to 32, respectively.

The signals Rs, Gs and Bs inputted to the luminance signal operation matrix circuit 9 are converted into a luminance signal Ys. As the luminance signal Ys, a Ys signal obtained by conversion from the R, G, B signals and a Y's signal obtained by conversion from the R', G', B' signals are outputted alternately by a switching operation of the 2-input switch circuits 27 to 29.

The output of the luminance signal operation matrix circuit 9 is subject to arithmetic operation processing with the color signals R, G, B by the subtraction circuits 17 to 19 so that it is converted into color difference signals Rs-Ys, Gs-Ys, Bs-Ys, respectively. As the color difference signals, the R-Y signal, G-Y signal and B-Y signal and the R'-Y' signal, G'-Y' signal and B'-Y' signal are outputted alternately by a switching operation of the 2-input switch circuits 27 to 29, respectively. From the luminance signal Y or Y' determined by the luminance signal operation matrix circuit 9, a Y signal or Y' signal is extracted using the sample hold circuit 33, and the Y signal or Y' signal is converted into an edge signal ΔY or ΔY' by the edge detection circuit 10.

Further, a Y signal component is extracted from the luminance signal Ys by the sample hold circuit 41. The Y signal component is outputted from the output terminal 37. The edge signal ΔY is converted into an absolute value |ΔY| by the absolute value operation circuit 11.

The absolute value |ΔY| obtained by the conversion by the absolute value operation circuit 11 is multiplied by a coefficient signal β inputted from the input terminal 4 by the multiplication circuit 16 to make a signal β|ΔY|. This signal β|ΔY| is limited in level with a limit level setting signal γ inputted from the input terminal 5 to obtain an output coefficient α. The output coefficient α is arithmetically operated by the multiplication circuits 13 to 15 with R-Y, G-Y, B-Y signals obtained by extraction by the sample hold circuits 30 to 32 from the color difference signals, which have been obtained by the arithmetic operation by the subtraction circuits 17 to 19, so that it is converted into output signals α(R-Y), α(G-Y), α(B-Y).

The output signals α(R-Y), α(G-Y), α(B-Y) of the multiplication circuits 13 to 15 are arithmetically operated with the color signals R, G, B from the input terminals 1 to 3 by the subtraction circuits 20 to 22 so that they are converted into signals R-α(R-Y), R-α(G-y), R-α(B-Y), respectively. The signals R-α(R-Y), R-α(G-y), R-α(B-Y) are outputted as R', G', B' signals to the output terminals 6 to 8 and also to the other or second inputs of the 2-input switch circuits 27 to 29, respectively.

Meanwhile, from the color difference signals extracted by the sample hold circuits 30 to 32, an R'-Y' signal, a G'-Y' signal and a B'-Y' signal are extracted by the sample hold circuits 30 to 32 and the sample hold circuits 34 to 36, respectively. The R'-Y' signal, G'-Y' signal and B'-Y' signal are outputted to the output terminals 38 to 40, respectively.

Figure 5:
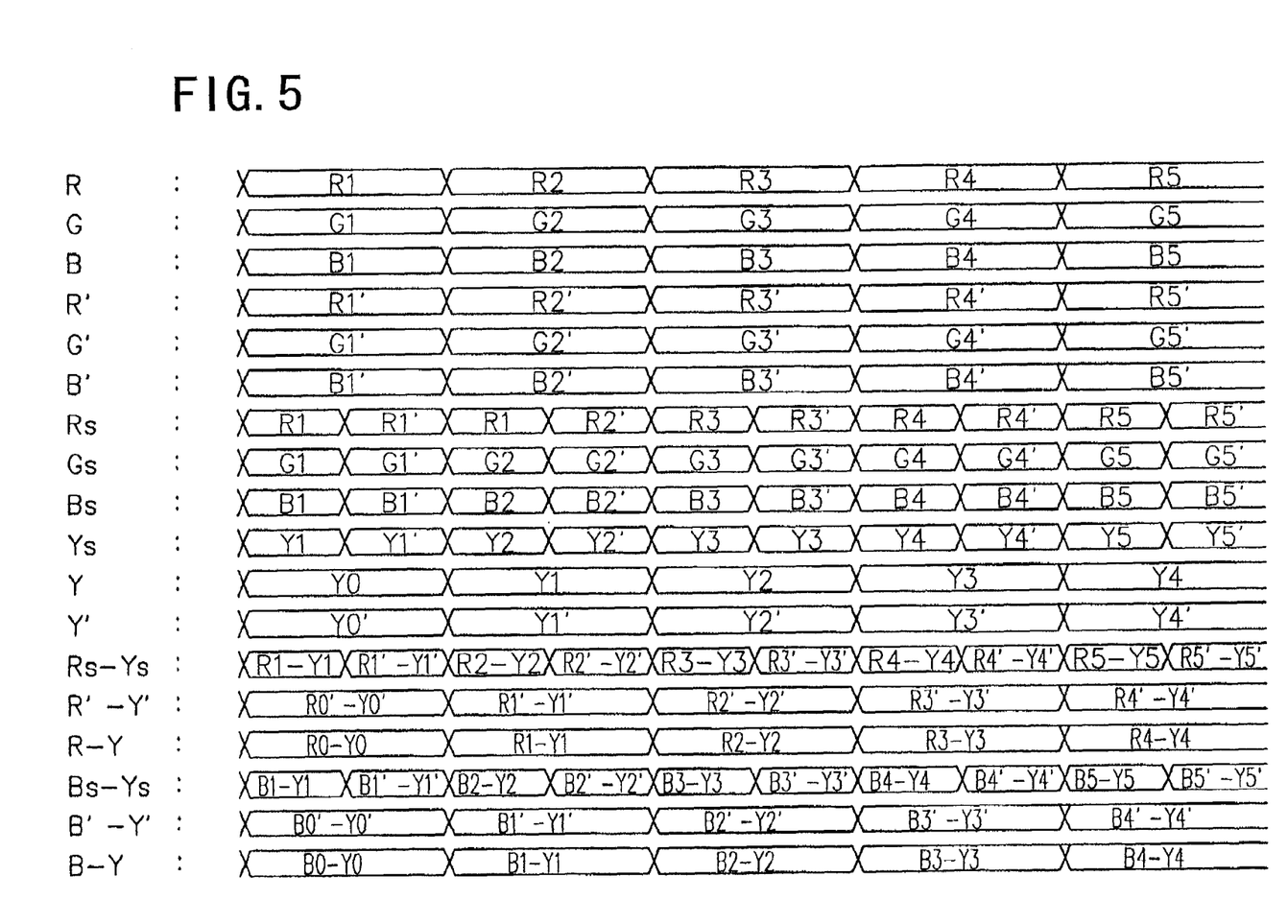
FIG. 5 is a timing chart illustrating an example of operation of the edge achromatization circuit of FIG. 4.

FIG. 5 illustrates an example of operation of the edge achromatization circuit of FIG. 4. The operation is different from that of the edge achromatization circuit of FIG. 1 illustrated in FIG. 3 in that waveforms regarding the luminance signal Ys obtained where the output signals Rs, Gs, Bs of the 2-input switch circuits 27 to 29 are used as inputs and the signals R-Y, G-Y, B-Y and R'-Y', G'-Y', B'-Y' which are outputs of the sample hold circuits 30 to 32 are shown.

While preferred embodiments of the present invention have been described using specific terms, such description is for illustrative purposes only, and it is to be understood that changes and variations may be made without departing from the spirit or scope of the following claims.

What is claimed is:

1. An edge achromatization circuit, comprising:
   luminance signal conversion means for converting first color signals inputted from an input terminal group before γ correction processing into a luminance signal;
   first subtraction means for arithmetically operating the luminance signal and the first color signals to obtain color difference signals;
   edge detection means for detecting an edge signal from the luminance signal;
   absolute value operation means for converting the edge signal into an absolute value;
   first multiplication means for multiplying the absolute from said absolute value operation means and a first coefficient signal inputted thereto from said input terminal group to control the gain of the value;
   level limit means for obtaining a second output coefficient from the value of the controlled gain and a limit level setting signal inputted thereto from said input terminal group;
   second multiplication means for multiplying the second output coefficient and the color difference signals outputted from said first subtraction means; and
   second subtraction means for arithmetically operating results of the multiplication by said second multiplication means and the first color signals to obtain second color signals to be outputted from said edge achromatization circuit.

2. An edge achromatization circuit as claimed in claim 1, wherein said edge detection means includes:
   delay means for delaying the luminance signal from said luminance signal conversion means by a unit time and outputting the delayed luminance signal; and
   third subtraction means for arithmetically operating the delayed luminance signal from said delay means and the luminance signal to produce an edge detection signal and outputting the edge detection signal.

3. An edge achromatization circuit as claimed in claim 1, wherein said input terminal group includes:
   a first terminal to which an R signal is inputted;
   a second terminal to which a B signal is inputted;
   a third terminal to which a G signal is inputted;
   a fourth terminal to which the first coefficient signal is inputted; and
   a fifth terminal to which the limit level setting signal is inputted.

4. An edge achromatization circuit, comprising:
   switching means for switchably outputting first color signals inputted from an input terminal group before γ correction processing and second color signals;
   luminance signal conversion means for converting the first color signals or the second color signals switchably inputted thereto from said switching means into a luminance signal;
   first subtraction means for arithmetically operating the luminance signal and the first color signals or the second color signals switchably inputted thereto from said switching means to obtain color difference signals;
   first sample hold means for extracting the color difference signals obtained by said first subtraction means;
   second sample hold means for extracting the luminance signal outputted from said luminance signal conversion means;

edge detection means for detecting an edge signal from the luminance signal extracted by said second sample hold means;

absolute value operation means for converting the edge signal into an absolute value;

first multiplication means for multiplying the absolute value from said absolute value operation means and a first coefficient signal inputted thereto from said input terminal group to control the gain of the value;

level limit means for obtaining a second output coefficient from the value of the control gain and a limit level setting signal inputted thereto from said input terminal group;

second multiplication means for multiplying the second output coefficient and the color difference signals extracted by said first sample hold means;

second subtraction means for arithmetically operating results of the multiplication by said second multiplication means and the first color signals or the second color signals switchably inputted from said switching means to obtain third color signals, third sample hold means for extracting color difference signals from the outputs of said first sample hold means; and fourth sample hold means for extracting a luminance signal component from the output of said second sample hold means.

5. An edge achromatization circuit as claimed in claim 4, wherein said edge detection means includes:

delay means for delaying the luminance signal from said luminance signal conversion means by a unit time and outputting the delayed luminance signal; and third subtraction means for arithmetically operating the delayed luminance signal from said delay means and the luminance signal to produce an edge detection signal and outputting the edge detection signal.

6. An edge achromatization circuit as claimed claim 4, wherein said input terminal group includes:

a first terminal to which an R signal is inputted;

a second terminal to which a B signal is inputted;

a third terminal to which a G signal is inputted;

a fourth terminal to which the first coefficient signal is inputted; and a fifth terminal to which the limit level setting signal is inputted.

7. An edge achromatization circuit, comprising first to fifth input terminals, luminance signal operation means, first to sixth subtraction means, first to fourth multiplication means, edge detection means, absolute value operation means, level limit means, and first to third output terminals;

said first to third input terminals being connected to an R signal input, a G signal input and a B signal input of said luminance signal operation means, minuend inputs of said first to third subtraction means and minuend inputs of said fourth to sixth subtraction means, respectively;

an output of said luminance signal operation means being connected to the minuend inputs of said first to third subtraction means and an input of said edge detection means;

outputs of said first to third subtraction means being inputted to first inputs of said first to third multiplication means, respectively;

an output of said edge detection means being connected to an input of said absolute value operation means;

an output of said absolute value operation means being connected to a first input of said fourth multiplication means;

said fourth input terminal being connected to a second input of said fourth multiplication means;

an output of said fourth multiplication means being connected to an input of said level limit means;

said fifth input terminal being connected to a limit level input of said level limit means;

an output of said level limit means being connected to second inputs of said first to third multiplication means;

outputs of said first to third multiplication means being connected to subtrahend inputs of said fourth to sixth subtraction means, respectively;

outputs of said fourth to sixth subtraction means being connected to said first to third output terminals, respectively.

8. An edge achromatization circuit as claimed in claim 7, wherein said edge detection means includes an input terminal, unit time delay means, subtraction means, and an output terminal, and said input terminal is connected to an input of said unit time delay means and one of inputs of said subtraction means while an output of said unit time delay means is connected to the other input of said subtraction means and an output of said subtraction means is connected to said output terminal.

9. An edge achromatization circuit, comprising:

first to fifth input terminals, luminance signal conversion means, first to sixth subtraction means, first to fourth multiplication means, edge detection means, absolute value operation means, level limit means, first to third 2-input switch means, first to eighth sample hold means, and first to seventh output terminals;

said first to third 2-input switch means having first input terminals to which first color signals from said first to third input terminals are inputted and second input terminals to which second color signals from said fourth to sixth subtraction means are inputted, respectively;

outputs of said first to third 2-input switch means alternately outputting the first color signals and the second color signals to said luminance signal conversion means and said first to third subtraction means, respectively;

said luminance signal conversion means alternately outputting a first luminance signal obtained by conversion from the first color signals and a second luminance signal obtained by conversion from the second color signals to said first to third subtraction means and said fourth sample hold means;

said first to third subtraction means arithmetically operating the first color signals and the first luminance signal or the second color signals and the second luminance signal to produce first color difference signals or second color difference signals to be outputted to said first to third sample hold means;

said fourth sample hold means outputting the luminance signal outputted from said luminance signal conversion means to said edge detection means and said eighth sample hold means;

said edge detection means detecting an edge signal from the luminance signal and outputting the edge signal to said absolute value operation means;

said absolute value operation means converting the edge signal into an absolute value and outputting the absolute value to said first multiplication means;

said first multiplication means outputting a value obtained by arithmetic operation of the absolute value from said absolute value operation means and a first output coefficient inputted from said fourth input terminal to said level limit means;

said level limit means calculating a second output coefficient from the value from said first multiplication means and a level limit setting signal inputted thereto from said fifth input terminal and outputting the second output coefficient to said second to fourth multiplication means;

said second to fourth multiplication means arithmetically operating the second output coefficient and the first color difference signals or the second color difference signals outputted from said first to third sample hold means and outputting results of the arithmetic operation to said fourth to sixth subtraction means, respectively;

said fourth to sixth subtraction means arithmetically operating the outputs of said second to fourth multiplication means and the first color signals or the second color signals to produce third color signals and outputting the third color signals to said first to third output terminals, respectively;

said fifth to seventh sample hold means extracting color difference signals from the outputs of said second to fourth sample hold means and outputting the color difference signals to said fifth to seventh output terminals, respectively, said eighth sample hold means extracting a luminance signal component from the output of said fourth sample hold means and outputting the luminance signal component to said fourth output terminal.

10. An edge achromatization circuit as claimed in claim 9, wherein said edge detection means includes an input terminal, unit time delay means, subtraction means, and an output terminal, and said input terminal is connected to an input of said unit time delay means and one of inputs of said subtraction means while an output of said unit time delay means is connected to the other input of said subtraction means and an output of said subtraction means is connected to said output terminal.

11. An edge achromatization method for an edge achromatization apparatus, comprising:
   a luminance signal conversion step of converting R, G, B signals inputted from an input terminal group of said edge achromatization apparatus before γ correction processing into a luminance signal;
   a first subtraction step of arithmetically operating the luminance signal and the R, G, B signals to obtain color difference signals;
   an edge signal detection step of detecting an edge signal from the luminance signal;
   an absolute value operation step of converting the edge signal into an absolute value;
   a first multiplication step of multiplying the absolute value and a first coefficient signal inputted from said input terminal group to control the gain of the value;
   a level limit step of obtaining a second output coefficient from the value of the controlled gain and a limit level setting signal inputted from said input terminal group;
   a second multiplication step of multiplying the second output coefficient and the color difference signals obtained by the first subtraction step; and
   a second subtraction step of arithmetically operating results of the multiplication by the second multiplication step and the R, G, B signals to obtain second color signals to be outputted from said edge achromatization apparatus.

12. An edge achromatization method as claimed in claim 11, wherein the edge detection step includes:
   a delay step of delaying the luminance signal obtained by the luminance signal conversion step by a unit time and outputting the delayed luminance signal; and
   a third subtraction step of arithmetically operating the luminance signal delayed by the delay step and the luminance signal to produce an edge detection signal and outputting the edge detection signal.

13. An edge achromatization method for an edge achromatization apparatus, comprising:
   a switching step of switchably outputting first color signals inputted from an input terminal group of said edge achromatization apparatus before γ correction processing and second color signals;
   a luminance signal conversion step of converting the first color signals or the second color signals switchably inputted by the switching step into a luminance signal;
   a first subtraction step of arithmetically operating the luminance signal and the first color signals or the second color signals switchably inputted by the switching step to obtain color difference signals;
   a first sample hold step of extracting the color difference signals obtained by the first subtraction step;
   a second sample hold step of extracting the luminance signal outputted by the luminance signal conversion step;
   an edge detection step of detecting an edge signal from the luminance signal extracted by the first sample hold step;
   an absolute value operation step of converting the edge signal into an absolute value;
   a first multiplication step of multiplying the absolute value and a first coefficient signal inputted from said input terminal group to adjust the gain of the value;
   a level limit step of obtaining a second output coefficient from the value of the controlled gain and a limit level setting signal inputted from said input terminal group;
   a second multiplication step of multiplying the second output coefficient and the color difference signals extracted by the first sample hold step;
   a second subtraction step of arithmetically operating results of the multiplication by the second multiplication step and the first color signals or the second color signals switchably inputted by the switching step to obtain third color signals;
   a third sample hold step of extracting color difference signals from the outputs of the first sample hold step; and
   a fourth sample hold step of extracting a luminance signal component from the output of the second sample hold step.

14. An edge achromatization method as claimed in claim 13, wherein the edge detection step includes:
   a delay step of delaying the luminance signal obtained by the luminance signal conversion step by a unit time and outputting the delayed luminance signal; and
   a third subtraction step of arithmetically operating the luminance signal delayed by the delay step and the luminance signal to produce an edge detection signal and outputting the edge detection signal.

* * * * *